United States Patent
Nanda et al.

(10) Patent No.: US 8,521,757 B1
(45) Date of Patent: Aug. 27, 2013

(54) METHOD AND APPARATUS FOR TEMPLATE-BASED PROCESSING OF ELECTRONIC DOCUMENTS

(75) Inventors: Bijaya Laxmi Nanda, Pune (IN); Navin Kabra, Pune (IN); Basant Rajan, Pune (IN)

(73) Assignee: Symantec Corporation, Mountain View, CA (US)

( * ) Notice: Subject to any disclaimer, the term of this patent is extended or adjusted under 35 U.S.C. 154(b) by 599 days.

(21) Appl. No.: 12/239,175

(22) Filed: Sep. 26, 2008

(51) Int. Cl.
*G06F 17/30* (2006.01)
*G06F 7/00* (2006.01)

(52) U.S. Cl.
USPC ............ 707/758; 707/769; 707/779; 706/15; 706/16; 706/25

(58) Field of Classification Search
None
See application file for complete search history.

(56) References Cited

U.S. PATENT DOCUMENTS

| | | | |
|---|---|---|---|
| 6,647,383 B1 * | 11/2003 | August et al. | 1/1 |
| 6,757,646 B2 * | 6/2004 | Marchisio | 704/8 |
| 6,760,694 B2 * | 7/2004 | Al-Kazily et al. | 704/2 |
| 6,865,568 B2 * | 3/2005 | Chau | 707/706 |
| 7,194,483 B1 * | 3/2007 | Mohan et al. | 707/600 |
| 7,254,571 B2 * | 8/2007 | Brown et al. | 1/1 |
| 7,437,023 B2 * | 10/2008 | King et al. | 382/305 |
| 2002/0136279 A1 * | 9/2002 | Al-Kazily et al. | 375/150 |
| 2002/0156678 A1 * | 10/2002 | Adams | 705/14 |
| 2003/0115188 A1 * | 6/2003 | Srinivasa et al. | 707/3 |
| 2003/0130899 A1 * | 7/2003 | Ferguson et al. | 705/26 |
| 2004/0103116 A1 * | 5/2004 | Palanisamy et al. | 707/104.1 |
| 2004/0243545 A1 * | 12/2004 | Boone et al. | 707/2 |
| 2004/0249809 A1 * | 12/2004 | Ramani et al. | 707/4 |
| 2005/0055365 A1 * | 3/2005 | Ramakrishnan et al. | 707/102 |
| 2005/0154701 A1 * | 7/2005 | Parunak et al. | 707/1 |
| 2006/0074909 A1 * | 4/2006 | Fredericks | 707/6 |
| 2006/0136589 A1 * | 6/2006 | Konig et al. | 709/224 |
| 2006/0242180 A1 * | 10/2006 | Graf et al. | 707/101 |
| 2007/0168382 A1 * | 7/2007 | Tillberg et al. | 707/102 |
| 2008/0016039 A1 * | 1/2008 | Brown et al. | 707/3 |
| 2008/0114756 A1 * | 5/2008 | Konig et al. | 707/5 |

* cited by examiner

*Primary Examiner* — Angelica Ruiz
(74) *Attorney, Agent, or Firm* — Wilmer Cutler Pickering Hale and Dorr LLP (57) ABSTRACT

Method and apparatus for template-based processing of electronic documents is described. In some examples, text content of the electronic documents is analyzed to identify whether each of the electronic documents matches any of a plurality of document templates. A template index is generated that relates at least one of the electronic documents with at least one of the plurality of document templates associated therewith. A search query is generated using at least one of the plurality of document templates as a respective at least one search parameter. An archive having the electronic documents is searched using the template index to locate any of the electronic documents that match the at least one document template of the search query.

9 Claims, 6 Drawing Sheets

METHOD AND APPARATUS FOR TEMPLATE-BASED PROCESSING OF ELECTRONIC DOCUMENTS

BACKGROUND OF THE INVENTION

1. Field of the Invention

The present invention relates generally to data processing. More particularly, the present invention relates to a method and apparatus for template-based processing of electronic documents.

2. Description of the Related Art

In a computing environment for an organization, a significant amount of electronic documents may be stored in data storage systems (e.g. a repository, archive, or the like). Often, the organization may be required to search for and obtain particular electronic documents from storage. For example, in legal applications, an organization may be required to search for and obtain particular electronic documents as part of an Electronic Discovery (E-Discovery) process. One common form of obtaining electronic documents is by using keyword-based searching techniques. Keyword searching, however, limits the manner in which relevant electronic documents are obtained. For example, an electronic document may be relevant, but may not include the exact keywords used in the search (e.g., the document may use synonyms of the keywords). Another problem with keyword searching is the retrieval of irrelevant and spurious electronic documents. For example, various electronic documents may include the exact keywords, but the context in which the keywords are used is irrelevant to the purpose of the search.

Accordingly, there exists a need in the art for a method and apparatus for processing electronic documents that overcomes the aforementioned deficiencies.

SUMMARY OF THE INVENTION

Aspects of the invention relate to a method and apparatus for processing electronic documents. In some embodiments, text content of the electronic documents is analyzed to identify whether each of the electronic documents matches any of a plurality of document templates. A template index is generated that relates at least one of the electronic documents with at least one of the plurality of document templates associated therewith. A search query is generated using at least one of the plurality of document templates as a respective at least one search parameter. An archive having the electronic documents is searched using the template index to locate any of the electronic documents that match the at least one document template of the search query.

Aspects of the invention relate to a method and apparatus for processing electronic documents. In some embodiments, an electronic document being sent over a network towards a destination is obtained. Text content of the electronic document is analyzed to identify that the electronic document matches at least one of a plurality of document templates. A document loss prevention (DLP) policy is obtained for the electric document based on the at least one document template associated therewith. The electronic document is selectively allowed to continue towards the destination, or blocked from continuing towards the destination, based on the DLP policy.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
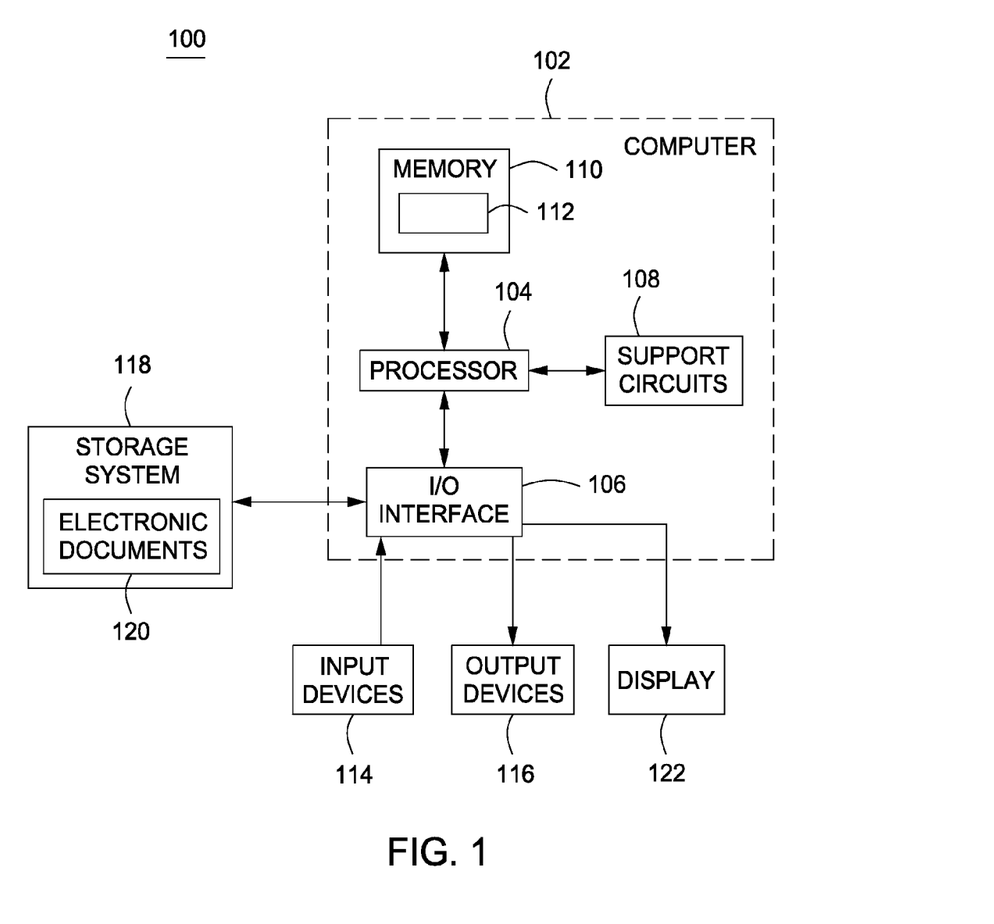
FIG. 1 is a block diagram depicting an exemplary embodiment of a computer system in accordance with one or more aspects of the invention.

FIG. 1 is a block diagram depicting an exemplary embodiment of a computer system 100 in accordance with one or more aspects of the invention. The computer system 100 includes a computer 102, a storage system 118, input devices 114, output devices 116, and a display 122. The computer 102 includes a processor 104, various support circuits 108, an input/output (IO) interface 106, and a memory 110. The processor 104 may include one or more microprocessors known in the art. The support circuits 108 for the processor 104 include conventional cache, power supplies, clock circuits, data registers, I/O interfaces, and the like. The I/O interface 106 may be directly coupled to the memory 110 or coupled through the processor 104. The I/O interface 106 may be configured for communication with various data sources 111, the input devices 114 (e.g., keyboard, mouse, and the like), the output devices 116 (e.g., printer, external devices, and the like), and the display 122. The memory 120 may include one or more of the following random access memory, read only memory, magneto-resistive read/write memory, optical read/write memory, cache memory, magnetic read/write memory, and the like.

The storage system 118 includes an archive of electronic documents 120. The storage system 118 may include various storage devices, such as hard disk drives, compact discs (CDs), digital versatile discs (DVDs), FLASH memories, tapes, and the like. The electronic documents 120 may include various types of documents, such as data files, electronic mail messages, and/or any other of the various types of electronic documents known in the art. The electronic documents 120 may be obtained from the data sources 111. The data sources 111 may include one or more of: data archives and backups; data stored on computers (e.g., desktop computers, portable computers, servers, etc.), data stored on other types of personal devices (e.g., cell phones, personal digital assistants (PDAs), portable storage units, etc.); and/or any other source of electronic documents known in the art.

The computer 102 is configured with electronic document processor 112. In some embodiments, the electronic document processor 112 comprises software configured for execution by the processor 104 to cause the computer 102 to process the electronic documents 120. While the electronic document processor 112 is described as being software executed by the processor 104, it is to be understood that the electronic document processor 112 may be implemented using hardware (e.g., via an application specific integrated circuit (ASIC) or programmable logic device (PLD), or a combination of hardware and software. It is to be understood that the computer 102 may generally represent one or more physically distinct computers such that the electronic document processor 112 may be distributed and executed across multiple physical computers.

Figure 2:
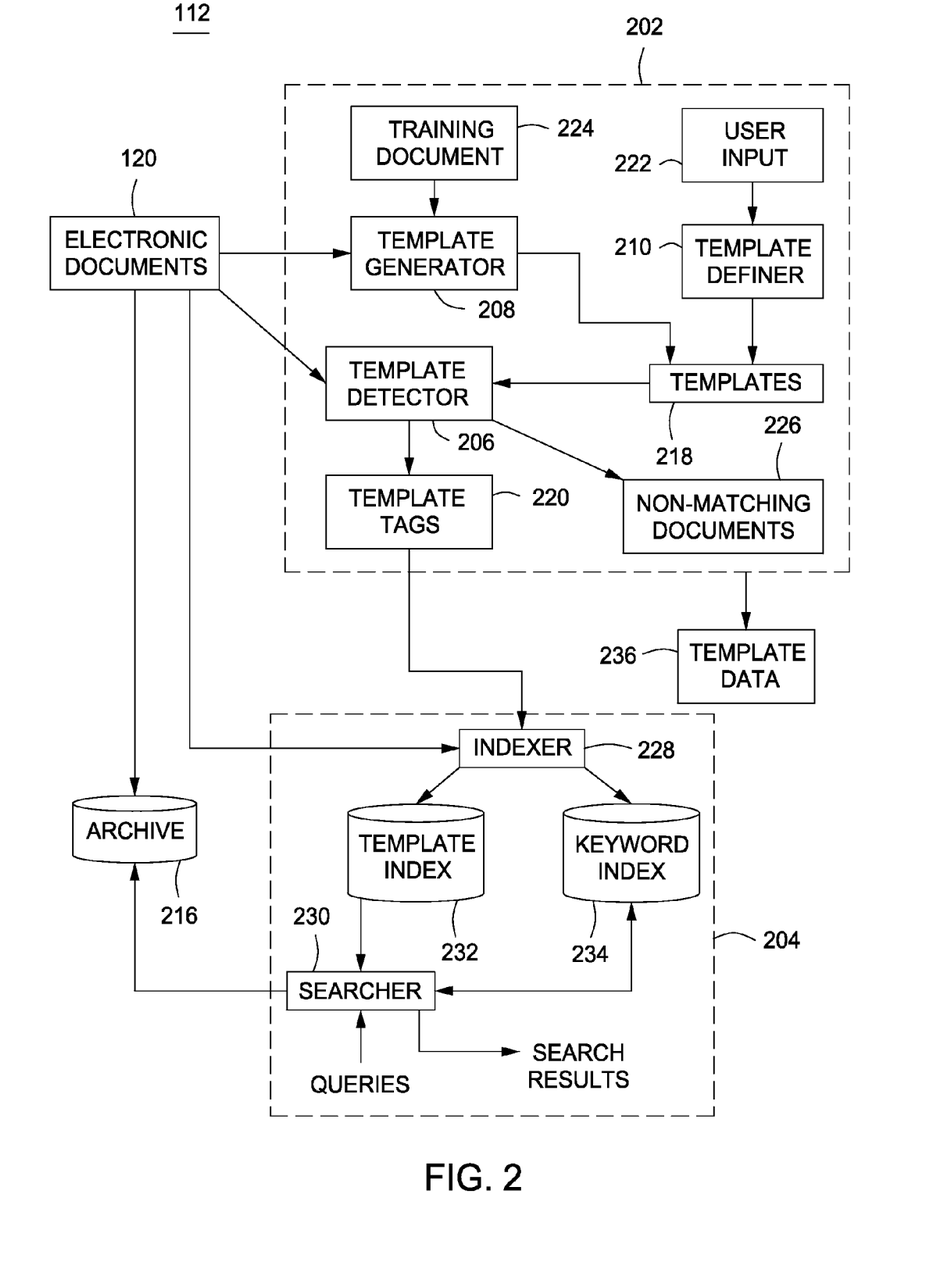
FIG. 2 is a block diagram depicting an electronic document processor according to some embodiments of the invention.

FIG. 2 is a block diagram depicting the electronic document processor 112 according to some embodiments of the invention. The electronic document processor 112 includes a template matching module 202 and a search module 204. In general, the template matching module 202 processes the electronic documents 120 as the electronic documents 120 are being stored in an archive 216. The search module 204 is configured to search the electronic documents 120 in the archive 216 using output from the template matching module 202.

In particular, the template matching module 202 includes a template detector 206, a template generator 208, and a template definer 210. The template detector 206 is configured to receive the electronic documents 120 as they are being stored in the archive 216. The template detector 206 also receives document templates 218. A document template can be a combination of words, phrases, text formats, and the like that generally describes one or more of the electronic documents 120. In some embodiments, a document template may be implemented using regular expression matching rules. A regular expression matching rule can be expresses using a well-defined regular expression syntax and can be processed by a regular expression processor in order to determine whether items of text content match. In such embodiments, the template detector 206 may employ a regular expression processor for processing the electronic documents 120 against the document templates 218.

The template detector 206 is configured to analyze the text content of the electronic documents 120 to identify whether each of the electronic documents 120 matches any of the document templates 218. A given electronic document may match one or more document templates. The template detector 206 produces information that relates electronic documents and their matching document template(s), which is referred to as template tags 220. For example, the template tags 220 may include relations between document identifiers and descriptions of document templates.

Notably, different types of electronic documents can match the same document template. For example, a MICROSOFT WORD document, an ADOBE ACROBAT document, and a Postscript document can each match the same document template, despite the different formats. The similarity among the electronic documents vis-à-vis the document template can be established by analyzing the text content of the data formats. In some embodiments, the template detector 206 may be configured to perform a character recognition process to convert bitmap or other graphically formatted documents into text content to be processed. Such character recognition processes are well known in the art. In addition, various well known techniques exist for extracting text content from well-known file formats, such as MICROSOFT WORD, ADOBE ACROBAT, Postscript, and like type known formats.

In some embodiments, one or more of the electronic documents 120 may include native document templates attached thereto. For example, MICROSOFT WORD documents may be created based on a document template (e.g., a .dot type template). Information associated with the native document template may be attached to the electronic document and may be obtained by the template detector 206. The native template of an electronic document may match one or more of the document templates 218 or may be used in conjunction with the text content to identify a match with one or more of the document templates 218.

In some embodiments, one or more of the document templates 218 may be produced by the template definer 210. The template definer 210 may define document templates in response to user input 222. For example, a user may interact with the template definer 210 using a graphical user interface (GUI) or the like (e.g., via the display 122 and the computer 102). The user input 222 generally represents predefined rules that can be used to construct a document template. In some embodiments, the user may define document templates using regular expression matching rules. Alternatively, a user may define or otherwise obtain sample document template, and the template definer 210 may be configured to automatically process the sample document template to produce regular expression matching rules based on the sample document template.

In some embodiments, one or more of the document templates 218 may be generated automatically using the template generator 208. In particular, the template generator 208 is configured to obtain the electronic documents 120 as they are stored in the archive 216. In some embodiments, the template generator 208 is configured to execute at least one machine learning algorithm that is responsive to various text constructs, such as words, phrases, sentences, and the like. In effect, the template generator 208 "learns" particular document templates that are common among the electronic documents 120. The machine learning algorithm(s) can be trained using one or more sample documents having predefined templates ("training documents 224"). The machine learning algorithm(s) may take some time to detect new document templates, as enough of the electronic documents 120 having a particular document template must be processed to decide that the particular document template exists. Once detected, new document templates may be added to the document templates 218.

In some embodiments, the template detector 206 is configured to generate a list of electronic documents that do not match any of the document templates 218 ("non-matching documents 226"). A user can analyze the non-matching documents 226 in order to identify previously unknown document templates. The user can then add such unknown document templates to the document templates 218 via the template definer 210. In some embodiments, the template detector 206 may be configured to re-process the non-matching documents 226 after new templates have been added to the document templates 218.

The search module 204 includes an indexer 228 and a searcher 230. The indexer 228 is configured to receive the template tags 220 from the template matching module 202. The indexer 228 is configured to process the template tags 220 to form a template index 232. The template index 232 relates electronic documents with the document templates 218. As noted above, a given electronic document may be associated with one or more of the document templates 218. The indexer 228 may also process the electronic documents 120 to produce a keyword index 234 using a well-known keyword indexing process.

The searcher 230 is configured to search the electronic documents 120 in the archive 216 in response to search queries. The searcher 230 may generate a search query using identifiers of one or more of the document templates 218 as respective search parameter(s). Template identifiers and/or template descriptions may be output by the template matching module 202 to be used for generation of search queries ("template data 236"). The searcher 230 may search the archive 216 for any electronic documents that match the identified document template(s) in the search query using the template index 232. For example, the template index 232 includes relates between electronic documents and document templates and thus can be used to identify electronic documents that match particular document templates, which allows the searcher 230 to retrieve such electronic documents from the archive 216.

A search based on particular document template(s) can retrieve more relevant documents than a search based on keywords. For example, consider an Invention Disclosure Form (IDF) document template that an organization may use to describe inventions. A search using keywords "invention disclosure form" may retrieve all IDF documents, but may also retrieve various e-mails and other documents that refer to IDF documents, which are not necessarily relevant. By using an IDF document template as a search parameter, a user can obtain only the IDF documents without any of the irrelevant data.

In some embodiments, the inventive template-based searching described above may be used in conjunction with keyword-based searching. For example, a user may search for all documents that match a pay slip document template and all pay slip documents that have a particular name as a keyword. Further, in some embodiments, the template-based searching described above can be used to refine search results obtained by keyword searching. In addition, in some embodiments, keyword searching can be used to refine search results obtained by template-based searching.

In some cases, a document template may change over time. When a document template changes, a new document template is added to the document templates 218 (e.g., either by the template definer 210 or the template generator 208). The template data 236 may be organized such that related templates are grouped together (e.g., a template and a new template based on a change to the template may be related and grouped together).

Figure 3:
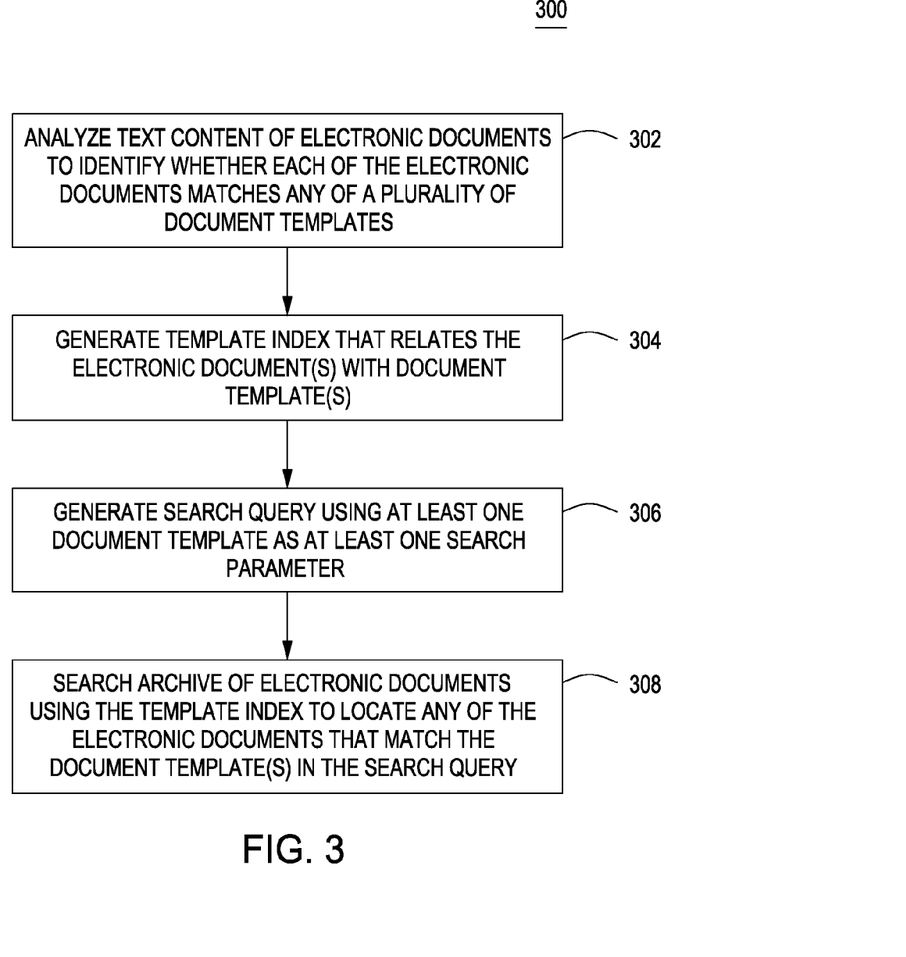
FIG. 3 is a flow diagram depicting a method of processing electronic documents according to some embodiments of the invention.

FIG. 3 is a flow diagram depicting a method 300 of processing electronic documents according to some embodiments of the invention. The method 300 begins at step 302, where text content of the electronic documents is analyzed to identify whether each of the electronic documents matches any of the plurality of document templates. At step 304, a template index is generated that relates at least one of the electronic documents with at least one of the document templates associated therewith. At step 306, a search query is generated using at least one of the document templates as a respective at least one search parameter. At step 308, an archive having the electronic documents is searched using the template index to locate any of the electronic documents that match the document template(s) of the search query.

Figure 4:
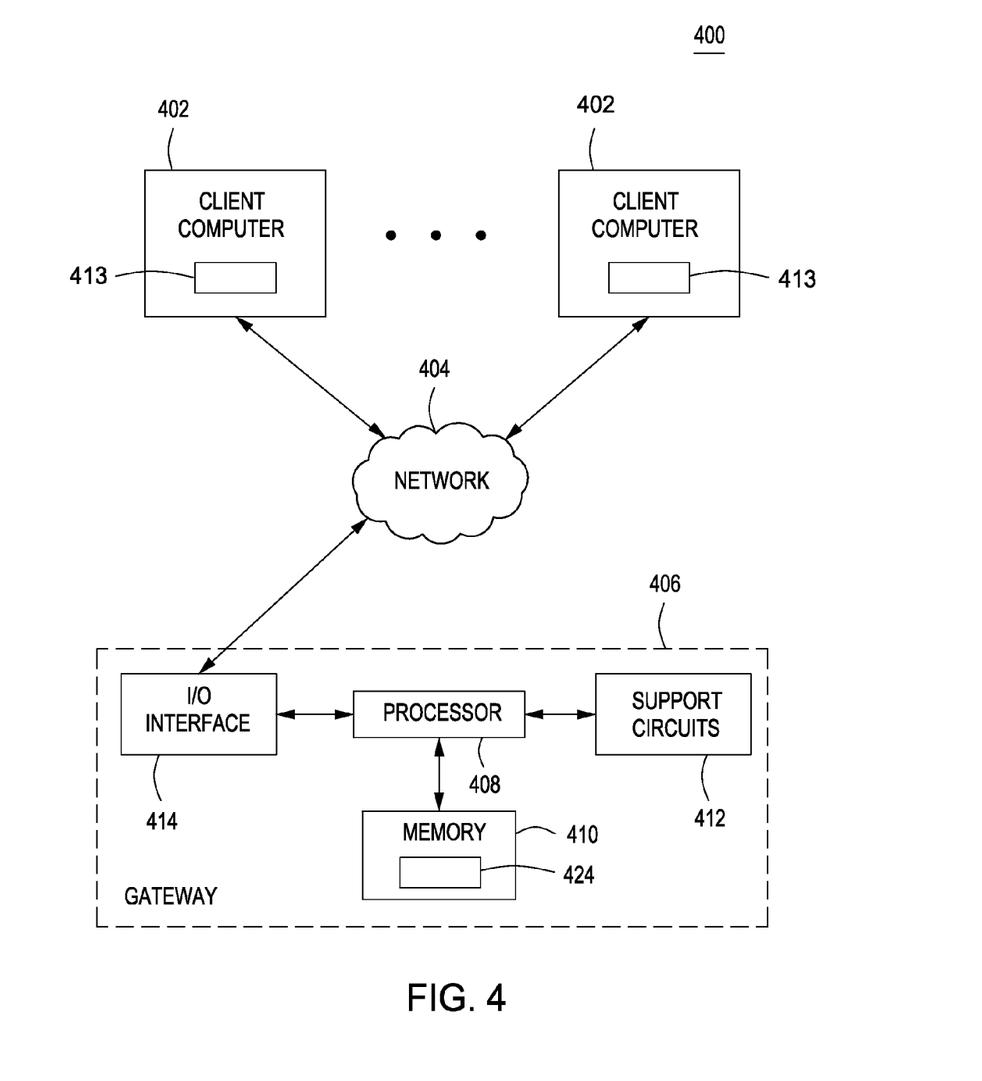
FIG. 4 is a block diagram depicting another exemplary embodiment of a computer system in accordance with one or more aspects of the invention.

FIG. 4 is a block diagram depicting an exemplary embodiment of a computer system 400 in accordance with one or more aspects of the invention. The system 400 includes client computers 402, a network 404, and a gateway 406. The network 404 comprises a communication system that connects computer systems by wire, cable, fiber optic, and/or wireless links facilitated by various types of well-known network elements, such as hubs, switches, routers, and the like. In particular, the network 404 connects the client computers 402 and the gateway 406, as well as other computers and devices that may be coupled to the network 404. The network 404 may employ various well-known protocols to communicate information. For example, the network 404 may employ internet protocol (IP), transmission control protocol (TCP), and the like for the transmission of packets. The network 404 may comprise part of a wide area network (WAN), such as the Internet, and/or all or part of a local area network (LAN).

Each of the client computers 402 includes an electronic mail (e-mail) agent 413. The client computers 402 may comprise any type of computing devices capable of implementing the e-mail agent 413. The e-mail agent 413 may comprise software executable by each of the client computers 402 to send and receive e-mail messages.

The gateway 406 is configured to implement a data loss prevention (DLP) service 424. The gateway 406 illustratively includes a processor 408, a memory 410, various support circuits 412, an I/O interface 414. The processor 408 may include one or more microprocessors known in the art. The support circuits 412 for the processor 408 include conventional cache, power supplies, clock circuits, data registers, I/O interfaces, and the like. The I/O interface 414 may be configured for communication with the network 404. The memory 410 may include one or more of the following random access memory, read only memory, magneto-resistive read/write memory, optical read/write memory, cache memory, magnetic read/write memory, and the like.

In some embodiments, the DLP service 424 comprises software configured for execution by the processor 408 to cause the gateway 406 to process e-mail messages sent by the client computers 402. While the DLP service 424 is described as being software executed by the processor 408, it is to be understood that the DLP service 424 may be implemented using hardware (e.g., via an application specific integrated circuit (ASIC) or programmable logic device (PLD), or a combination of hardware and software.

Figure 5:
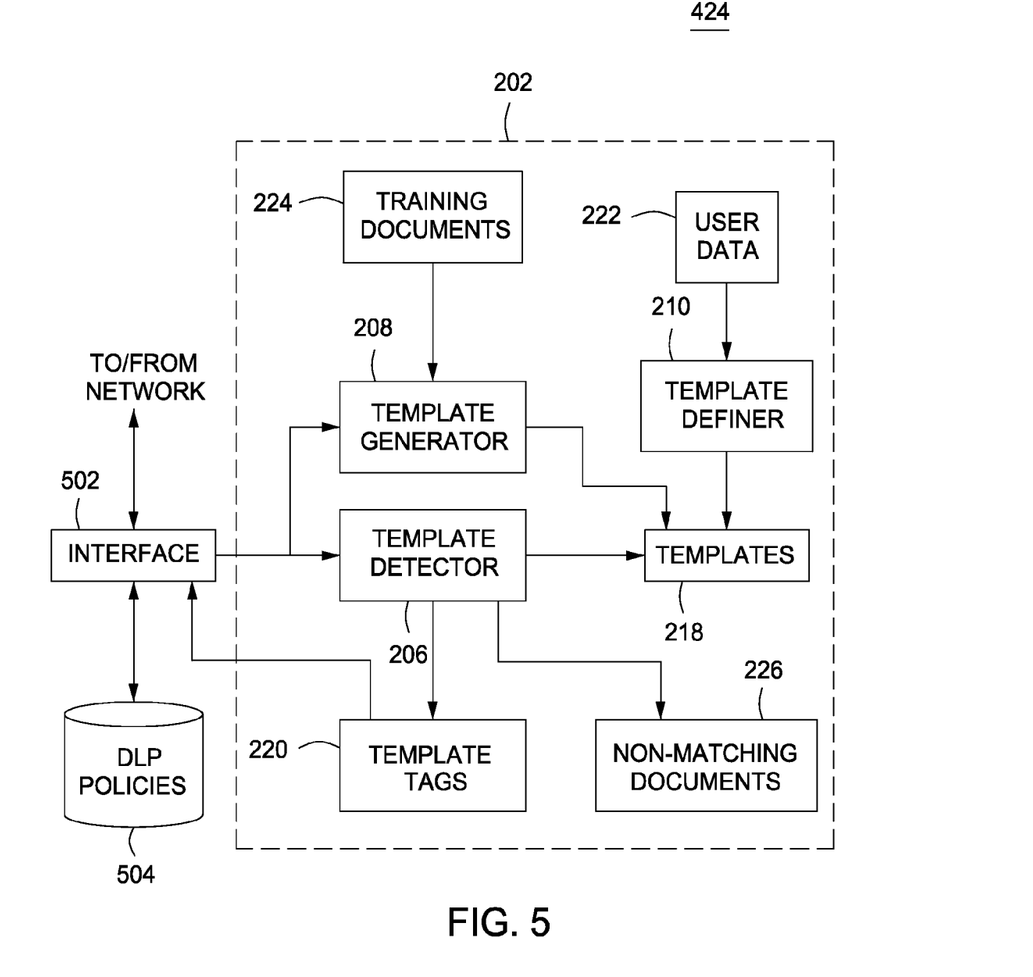
FIG. 5 is a block diagram depicting a document loss prevention (DLP) service according to some embodiments of the invention.

FIG. 5 is a block diagram depicting the DLP service 424 according to some embodiments of the invention. The DLP service 424 includes an interface 502 and the template matching module 202. The interface 502 is configured for communication with the network 404 to receive e-mail messages sent by the client computers 402 towards destination addresses. The interface 502 is configured to analyze each e-mail message to identify any attached electronic documents therein. A given e-mail message may include one or more attached electronic documents. For each e-mail having attached electronic document(s), the interface 502 provides the electronic document(s) to the template module 202.

The template matching module 202 operates as described above with respect to FIG. 2. In particular, the template detector 206 is configured to receive the electronic documents from the interface 502. The template detector 206 operates as described above to produce the template tags 220 using the templates 218. The template detector 206 may also produce the non-matching documents 226. The template generator 208 may also receive and process the electronic documents from the interface 502 to generate one or more of the templates 218. One or more of the templates 218 may be generated by the template definer 210, as described above.

The interface 502 is configured to receive the template tags 220 from the template matching module 202. The template tags 220 provide an indication of which electronic documents in a given e-mail message, if any, having matching document templates. If none of the electronic documents in an e-mail message have matching document templates, the interface 502 allows the e-mail message to continue towards its destination. If one or more of the electronic documents have matching document template(s), then the interface 502 makes a determination whether the electronic document(s) should be sent or blocked.

In particular, the interface 502 is configured to receive DLP policy data 504. The DLP policy data 504 includes DLP policies respectively associated with the document templates 218. A DLP policy can generally dictate whether documents having a particular document template may be sent in an e-mail. In some cases, a DLP policy can block all e-mails having an attached document that matches a particular document template. In some cases, a DLP policy can dictate which destinations are acceptable for an e-mail message having an attached document that matches a particular document template. In some cases, a DLP policy can dictate which destinations are unacceptable for an e-mail message having an attached document that matches a particular document template. In some cases, a DLP policy can have a combination of such data.

Given a particular matching document template, the interface 502 obtains a corresponding DLP policy from the DLP policy data 504. The interface 502 selectively allows the electronic document to continue towards its destination, or blocks the electronic document, based on the retrieved DLP policy. The interface 502 performs this function for each attached electronic document that has a matching document template as determined by the template matching module 202. In some embodiments, the interface 502 can block an entire e-mail if the e-mail has an attached document that is to be blocked. In other embodiments, the interface 502 can strip any attached documents to be blocked from an e-mail, but still allow the e-mail itself along with any un-blocked attachments to proceed towards its destination. In some embodiments, the interface 502 can send a notification to the originator of the e-mail message that particular electronic document(s) have been blocked or that the e-mail message has been blocked.

Figure 6:
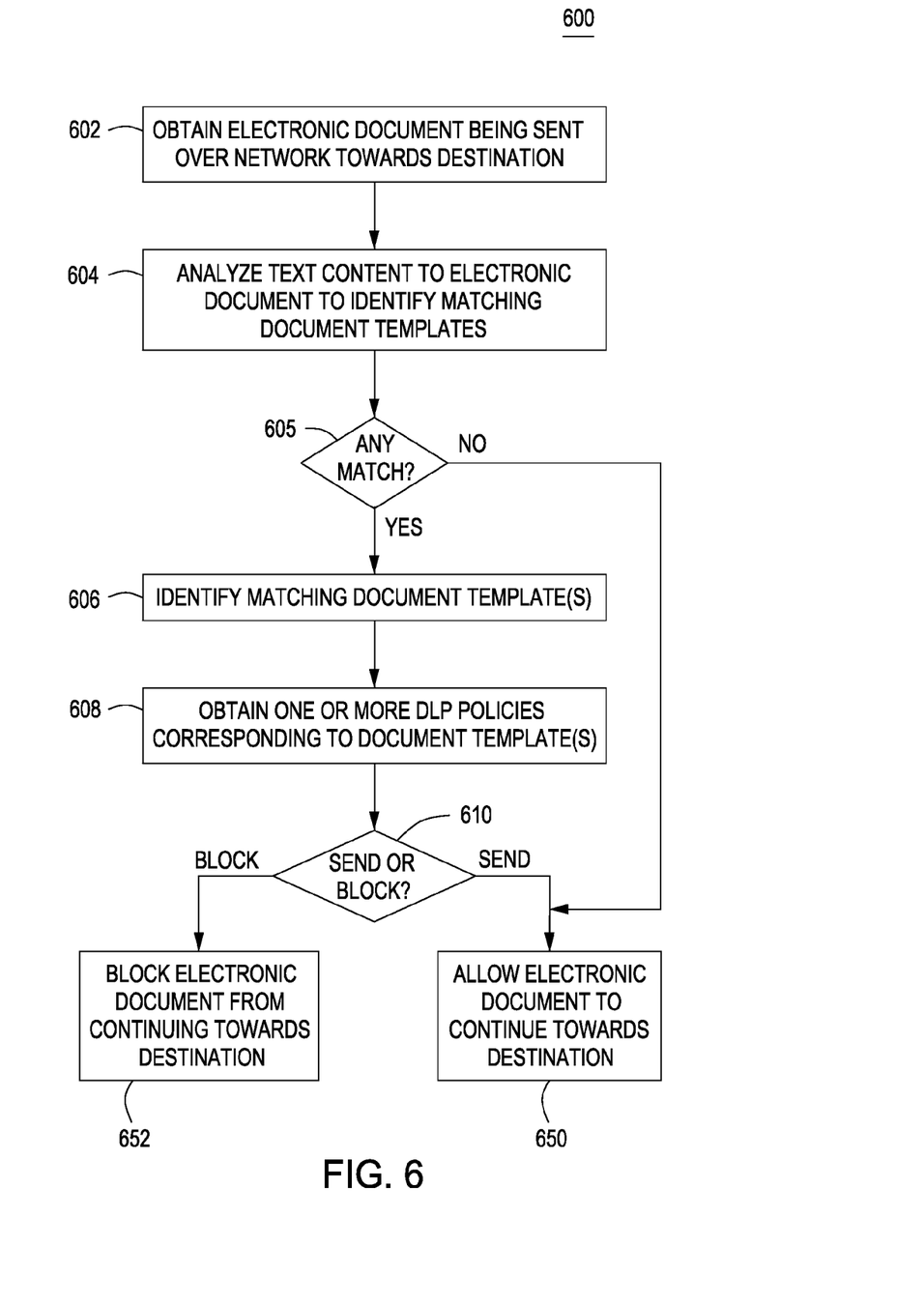
FIG. 6 is a flow diagram depicting a method for processing electronic documents according to some embodiments of the invention.

FIG. 6 is a flow diagram depicting a method 600 for processing electronic documents according to some embodiments of the invention. The method 600 begins at step 602, where an electronic document being sent over a network towards a destination is obtained. At step 604, the text content of the electronic document is analyzed to identify any matching document templates. At step 605, if there are no matching document templates, the method 604 proceeds to step 650. Otherwise, the method 600 proceeds to step 606. At step 606, one or more document templates are identified that match the electronic document. At step 608, one or more DLP policies is/are obtained that correspond to the document template(s). At step 610, a determination is made whether the electronic document should be sent or blocked based on the DLP policy data. If the electronic document should be sent, the method 600 proceeds to step 650, where the electronic document is allowed to continue towards it destination. If the electronic document should be blocked, the method 600 proceeds to step 652, where the electronic document is blocked from continuing towards its destination. The method 600 may be repeated for various electronic documents. In some embodiments, the electronic documents processed by the method 600 may be attachments of e-mail messages being sent towards one or more destination addresses.

Aspects of the methods described above may be implemented as a program product for use with a computer system. Program(s) of the program product defines functions of embodiments and can be contained on a variety of computer readable media, which include, but are not limited to: (i) information permanently stored on non-writable storage media (e.g., read-only memory devices within a computer such as CD-ROM or DVD-ROM disks readable by a CD-ROM drive or a DVD drive); and (ii) alterable information stored on writable storage media (e.g., floppy disks within a diskette drive or hard-disk drive or read/writable CD or read/writable DVD). Such computer readable media, when carrying computer-readable instructions that direct functions of the invention, represent embodiments of the invention.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer implemented method of processing electronic documents, comprising:
   analyzing text content of the electronic documents to identify whether each of the electronic documents matches any of a plurality of predefined document templates, wherein one or more of the electronic documents conforms to a structure of at least one of the plurality of predefined document templates, and wherein the step of analyzing comprises executing at least one machine learning algorithm, the at least one machine learning algorithm trained using at least one sample electronic document having a predefined template;
   generating a template index that relates at least one of the electronic documents with at least one of the plurality of predefined document templates based at least in part upon an identified match between the at least one of the electronic documents and the at least one of the plurality of predefined document templates;
   generating a search query using at least one of the plurality of predefined document templates as at least one search parameter;
   searching an archive having the electronic documents using the template index to locate one or more of the electronic documents that match the at least one predefined document template of the search query; and
   providing access to the one or more of the electronic documents that match the at least one predefined document template of the search query.

2. The method of claim 1, wherein the at least one machine learning algorithm is responsive to text constructs in the text content of the electronic documents to identify whether each of the electronic documents matches any of the plurality of predefined document templates.

3. The method of claim 2, further comprising:
   detecting, through the execution of the at least one machine learning algorithm, at least one new document template; and
   adding the at least one new document template to the plurality of predefined document templates.

4. The method of claim 1, further comprising:
   generating a list including at least one of the electronic documents that does not match any of the plurality of predefined document templates.

5. The method of claim 1, further comprising:
   generating at least one new document template based on one or more predefined rules.

6. The method of claim 1, further comprising:
   analyzing a predefined native document template of at least one of the electronic documents to identify whether the predefined native template thereof matches any of a plurality of predefined document templates.

7. An apparatus for processing electronic documents, comprising:
   means for analyzing text content of the electronic documents to identify whether each of the electronic documents matches any of a plurality of predefined document templates, wherein one or more of the electronic documents conforms to a structure of at least one of the plurality of predefined document templates, and wherein the means for analyzing comprises means for executing at least one machine learning algorithm, the at least one machine learning algorithm trained using at least one sample electronic document having a predefined template;

means for generating a template index that relates at least one of the electronic documents with at least one of the plurality of predefined document templates based at least in part upon an identified match between the at least one of the electronic documents and the at least one of the plurality of predefined document templates;

means for generating a search query using at least one of the plurality of predefined document templates as at least one search parameter;

means for searching an archive having the electronic documents using the template index to locate one or more of the electronic documents that match the at least one predefined document template of the search query; and means for providing access to the one or more of the electronic documents that match the at least one predefined document template of the search query.

8. The apparatus of claim 7, wherein the at least one machine learning algorithm is responsive to text constructs in the text content of the electronic documents to identify whether each of the electronic documents matches any of the plurality of predefined document templates.

9. The apparatus of claim 7, further comprising:
means for generating at least one of the plurality of document templates based on one or more predefined rules.

\* \* \* \* \*